Figure 1:
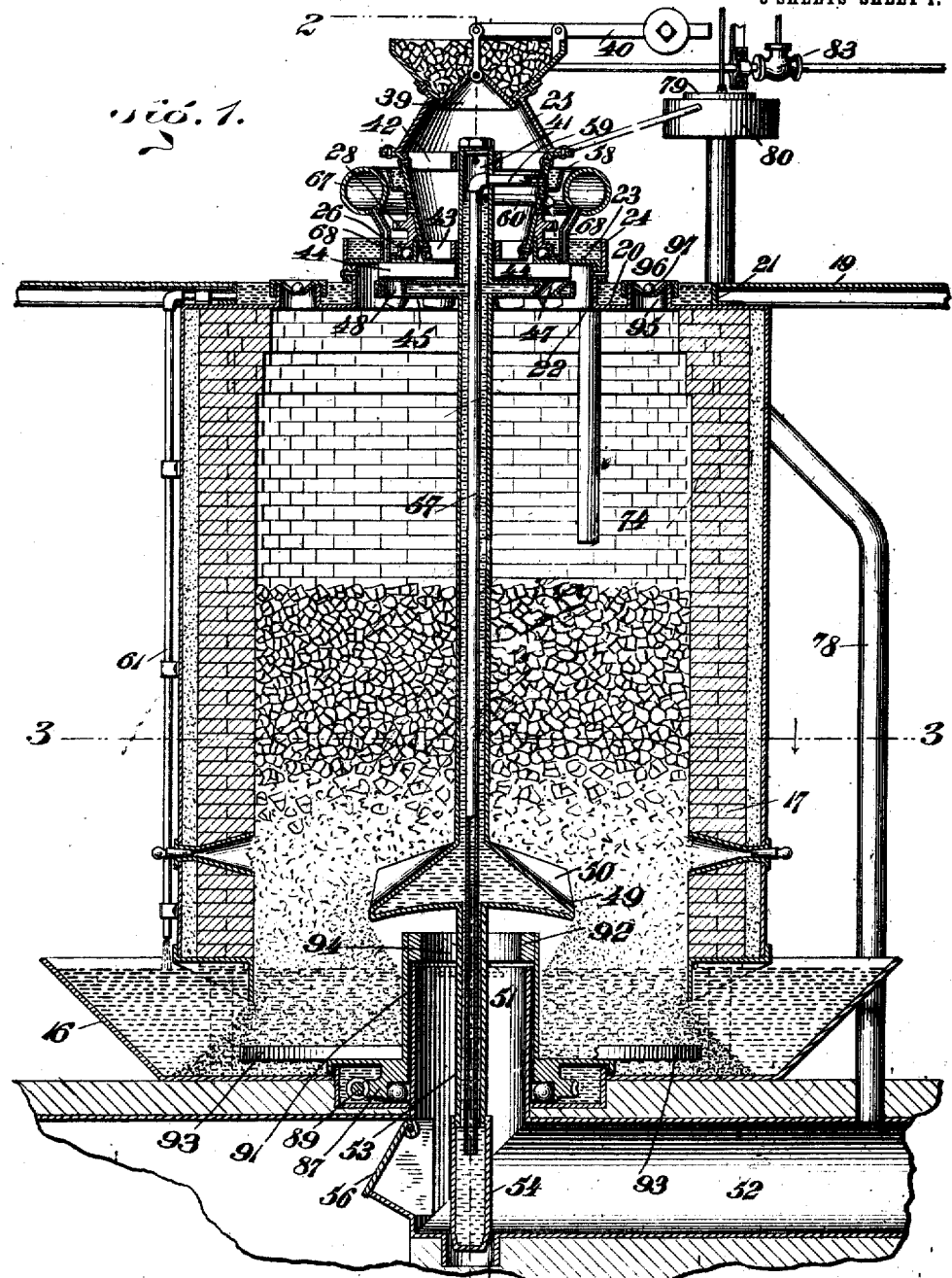

W. B. CHAPMAN.
GAS PRODUCER.
APPLICATION FILED SEPT. 8, 1905.

999,698.

Patented Aug. 1, 1911.
3 SHEETS—SHEET 1.

WITNESSES:
R. C. Abbott
Isaac B. Owens.

INVENTOR
William B. Chapman
BY
Munn
ATTORNEYS

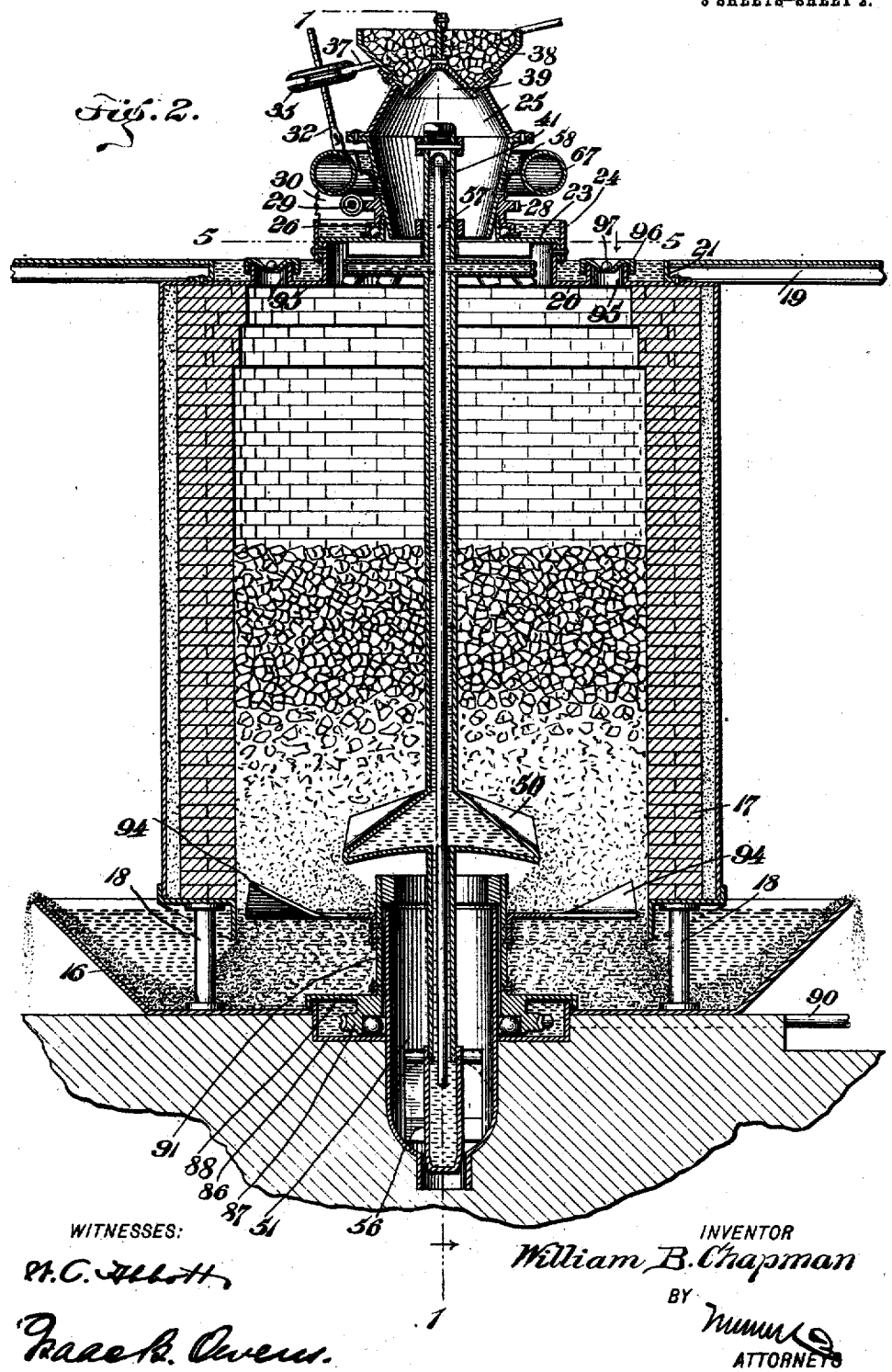

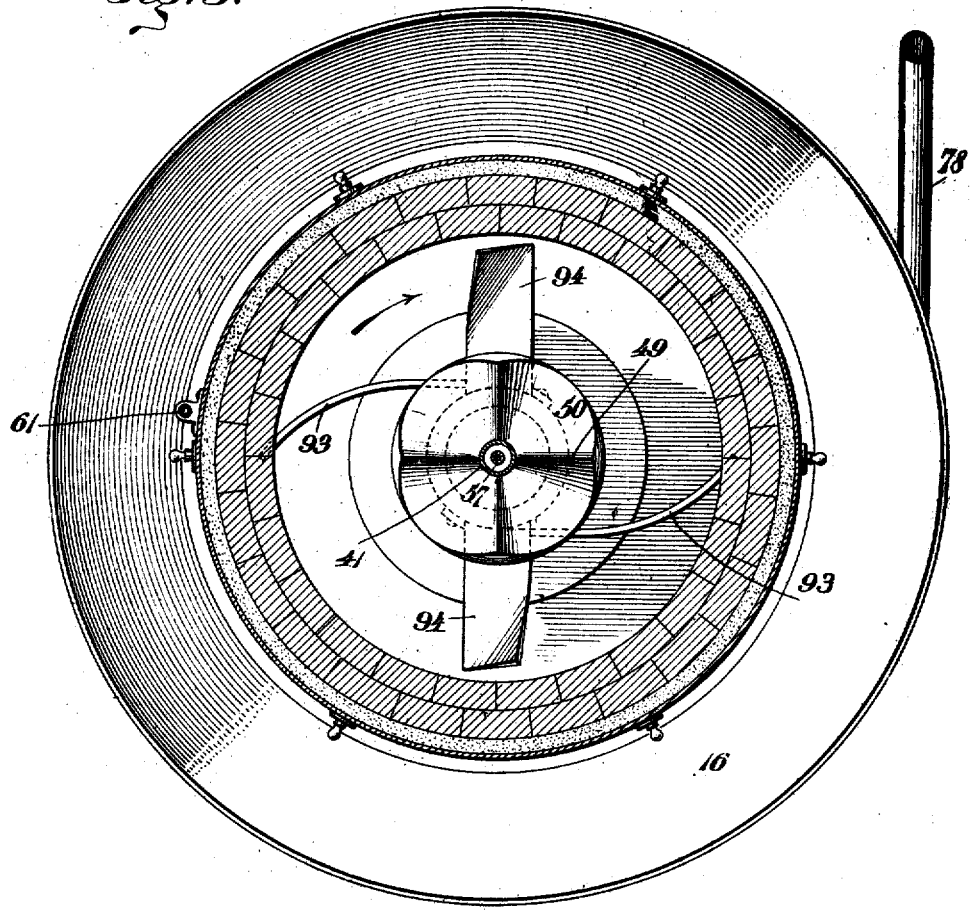

UNITED STATES PATENT OFFICE.

WILLIAM B. CHAPMAN, OF NEW YORK, N. Y., ASSIGNOR TO WALTER B. HOPPING, TRUSTEE, OF NEW YORK, N. Y.

GAS-PRODUCER.

999,698.     Specification of Letters Patent.     Patented Aug. 1, 1911.

Application filed September 8, 1905. Serial No. 277,541.

*To all whom it may concern:*

Be it known that I, WILLIAM B. CHAPMAN, a citizen of the United States, and a resident of the city of New York, borough of Brooklyn, in the county of Kings and State of New York, have invented a new and Improved Gas-Producer, of which the following is a full, clear, and exact description.

My invention relates to a down draft, pressure gas producer especially intended for use with bituminous coals, but capable of handling fuels of other sorts.

An important feature of my invention resides in devices for agitating the fuel bed, whereby to break down or destroy the blow holes of "chimneys" which tend to form therein and which, if allowed to form, greatly interfere with the proper operation of the apparatus. This agitation of the fuel bed, according to my invention, I accomplish by agitating devices located in and acting through the medium of the ash stratum and, therefore, removed from the intense heat of the incandescent zone; and I so construct and organize the parts that the agitating devices have combined with them means for disposing of the ashes as the same are formed.

My invention involves various other features of importance all of which will be fully set forth hereinafter and particularly pointed out in the claims.

Reference is had to the accompanying drawings which illustrate as an example the preferred manner of practically embodying my invention, in which drawings—

Figure 1 is a vertical section taken through the producer and showing the same in operation, said view being in section on the line 1—1 of Fig. 2; Fig. 2 is a vertical section on the line 2—2 of Fig. 1; and Fig. 3 is a horizontal section on the line 3—3 of Fig. 1.

The producer should be erected on a suitable bed or foundation 15.

16 indicates the ash pan on which the body 17 of the producer is placed, the said body being sustained above the bottom of the pan by pillars 18 which allow the open lower end of the body to be water sealed, and at the same time permit the free discharge of the ashes. The body of the producer is preferably constructed with a refractory lining surrounded by a mass of insulation, which in turn is surrounded by a polished metal shell preventing the conduction and radiation of heat. At the top of the body of the producer an elevated platform 19 or charging floor may be arranged to facilitate the movement of the workmen and the supply of fuel to the producer.

The top 20 of the producer has a vertical flange 21 around its outer portion, forming with the flange 22 a pan for cooling water. Said flange 22 surrounds a central opening in the top, and over the flange 22 is placed a cover plate 23. This cover plate is water cooled, as indicated in the drawings, the water being confined by an annular wall 24 rising from the outer edge of the cover. The cover 23 has a central opening in which is placed the open lower end of the rotary fuel box 25. This fuel box is associated with devices for evenly and continuously feeding the fuel into the producer which devices may be of any suitable sort and form no part of the present invention.

41 indicates a hollow shaft the upper end of which extends into the rotary fuel box 25 and which shaft is firmly connected to and supported from said box by means of two spiders 42 and 43. According to the construction here illustrated, the hollow shaft 41 carries immediately below the box 25 a water-chambered disk or table 45 which rotates with the shaft and forms part of the mechanical feeder or charger, but this is not essential to the present invention. 74, 78 and 80 indicate certain elements of a regulating device which also is not a part of the present invention.

The hollow shaft or tube 41 extends from the spiders 42 and 43 and table 45 down through the center of the producer and the fuel bed into the ash stratum, where it is provided with a chambered hood 49. This hood communicates with the interior of the hollow shaft so as to receive the cooling water therefrom, and may, if desired, be provided on its upper surface with ribs 50 for agitating the fuel. Said hood overhangs the gas discharge pipe 51, which passes from the lower part of the body 17 of the producer downward into the foundation 15 where it communicates with the main 52 leading the gas to the scrubbers, purifiers, receiver, etc. Below the hood 49 the hollow shaft 41 has a downward extension 53 which extends through the gas outlet pipe, and has at its lower end a mud cup 54 which is removably engaged with the extension 53. Said mud cup 54 is seated in a bearing cavity 55 formed in the bottom of the main 52, and in this manner the lower end of the shaft 41 with its attachments is braced and the parts prevented from lateral displacement without, however, interfering with their free rotation.

56 indicates a door which commands an opening in the inner end of the main 52 through which opening the mud cup 54 may be detached from the shaft extension 53 to permit of clearing out the sediment which may accumulate in said cup.

Extending through the tubular shaft or pipe 41 is a pipe 57 which reaches from a point adjacent to the mud cup 54 to the upper end of the tubular shaft 41, and communicates with a water cup 58 by means of a lateral branch pipe 59. The upper portion of the pipe or tubular shaft 41 is provided with a lateral branch 60 which extends out through the walls of the fuel box 25 and discharges into the water pan on top of the cover plate 28. The circulating water is supplied to the pan 58 from any suitable source and passes through the branch pipe 59 into the pipe 57, down through this pipe and up through the parts 53, 50 and 41. From the upper end of the last named element the water escapes by the branch 60 into the pan on the cover 23. In this manner the hood 50 and table 45, if desired, are sustained in proper position, and are adequately cooled. The head 50, it will be observed, overhangs the receding end of the gas discharge pipe 51, and causes an open space around said end of the pipe 51, thus preventing the ash from entering the gas pipe and allowing a free and unobstructed flow of gas into and through the same. From the water pan on top of the cover 23 the water overflows to the pan formed on the top of the head 20 of the producer, and from this pan the water is conducted by a pipe 61 downward into the ash pan 16, maintaining the water therein at an elevation sufficient to seal the lower end of the producer body and to completely extinguish any vestige of fire that might remain in the ash as it is discharged. From the pan 16 the water may be allowed to overflow into the sewer or other place of disposition which will be understood fully from the drawings. The producer is supplied at the top with atmospheric air heated, if desired. Also if desired this air may be mixed with vapor produced in any suitable manner. For so supplying the air or draft a bustle pipe 67 and twyers 68 are provided.

86 indicates a secondary pan or cavity formed in the bottom of the ash pan 15, and adapted to be filled with water from said pan as indicated in the drawings. In this secondary pan is arranged a worm gear 87. Said gear is provided with an annular shield 88 which overhangs the secondary pan 86, and prevents the entry of ashes into the same. The gear 87 is arranged to revolve around the outlet pipe 51, and if desired anti-friction bearing balls may be applied to the parts to reduce friction in the manner shown in the drawing. The said gear is revolubly driven by means of a worm 89 which is attached to the shaft 90. The shaft 90 extends from the interior of the secondary pan 86 outward through a stuffing box (not shown), to permit the application of power to the shaft in any desired manner. As illustrated best in Figs. 1 and 3 the gear 87 has a sleeve 91 which rises from the gear outside of the gas outlet pipe 51, the sleeve 91 projecting above the gas outlet pipe and having inwardly extending flange 92 at its upper end which overhangs the end of the pipe, as shown. This sleeve 91 carries at its base ash discharge arms 93, which are preferably two in number. These arms are arranged to rotate with the gear and sleeve over the bottom of the ash pan 16, and owing to the form of the arms, as shown in Fig. 3, they serve to throw the ashes outward toward the periphery of the pan 16, the ashes passing over the edge thereof, as illustrated best in Fig. 2. This discharge of the ashes from the edge of the pan may, if necessary, be assisted by an attendant using a shovel or like tool. The sleeve 91 is provided at or near its upper end with agitating arms 94 which are preferably two in number and arranged opposite each other. These arms rotate with the sleeve and have inclined portions, which when the parts are rotated in the direction indicated by the arrow in Fig. 3 will act to cause an upheaval of the ash around the sides of the body of the producer. This movement or upheaval of the ash is communicated to the fuel and in this manner the fuel bed is automatically shaken, thus avoiding blow holes or "chimneys" and preventing the formation of clinkers on the producer walls. In connection with the location of the agitator arms 94 in the ash stratum, it is pointed out that this is of material advantage in that the agitator is not subjected to the intense heat of the fuel bed. Heretofore agitator arms have been located directly in the fuel bed, and the intense heat at this point soon destroys them, even though water cooled. The agitation of the fuel bed effected by the agitator arms 94 extends ordinarily to the top of the fuel bed. If necessary, however, the agitation of the fuel may easily be completed by a small amount of barring down of the producer through openings 95 in the top thereof. These openings are surrounded by flanges on which are located caps 96, and the caps are formed with central orifices commanded by ball valves 97, as shown. Any desired number of these devices may be placed in the top of the producer, and the operator in barring down the fuel bed has only to enter the bar through the opening in the cap 96 momentarily displacing the ball 97. The caps 96 may be removed to enter kindling into the producer, and also to permit a full view of the interior.

In operation the fire is started in the producer and the flow of water is begun to prevent excessive heating of the destructible parts. Upon the operation of the charging means the gradual and automatic feed of fuel into the producer will begin. At the same time air is supplied to the producer from the bustle pipe 67, as explained, so as to furnish the necessary oxygen for combustion and the pressure for the necessary draft through the producer. The gas formed by the several reactions occurring in the producer escapes through the pipe 51 and main 52. It will thus be seen that I provide a producer which is almost entirely automatic in its action, and which is kept at a uniform temperature producing a clean gas of nearly uniform quality, that provision is made for thoroughly agitating the ash stratum and fuel bed, thus maintaining the fuel bed level and avoiding chimneys and clinkers. I also provide for effectually cooling those parts which are liable to destruction by heat.

Having thus described the preferred form of my invention, what I claim as new and desire to secure by Letters Patent is:

1. A down draft gas producer having a gas outlet pipe extending vertically in the lower part of the producer and provided with an open upper end, a hood overhanging the said upper end to prevent entry of foreign matter into the outlet tube, an ash pan surrounding the open bottom of the body of the producer, an agitator located in the ash stratum and adapted to turn around the outlet pipe to agitate the fuel bed and an ash discharge means located in the pan and adapted to turn around the fuel outlet pipe to discharge the ashes toward the edge of the pan.

2. A gas producer having an ash pan adapted to receive water and a gas outlet pipe passing downward through the pan and cooled by the water therein and a rotary agitator having a sleeve surrounding the outlet pipe.

3. A gas producer having two agitators operating in the ash stratum and means for independently driving them.

4. A gas producer having a body, a pipe or nozzle at the bottom thereof, a member mounted to rotate on the pipe, means for rotating said member, an ash plow carried at the lower portion of said member to expel the ashes and an agitator carried at the upper portion of said member in the ash stratum to shake the fuel bed through the medium of the ashes.

5. A gas producer having a body, a pipe or nozzle at the bottom thereof, a member mounted to rotate on the pipe, means for rotating said member, an ash plow carried at the lower portion of said member to expel the ashes, an agitator carried at the upper portion of said member in the ash stratum to shake the fuel bed through the medium of the ashes and a revolving hood mounted over the end of the outlet pipe and having an irregular upper surface to serve as an agitator.

6. A gas producer having a body, an ash pan below the same, a pipe extending through the bottom of the ash pan, an ash plow in the bottom of the pan to expel the ashes, an agitator located above the plow and adapted to shake the fuel bed through the medium of the ashes and means for operating said plow and agitator.

7. A gas producer having a body, an ash pan below the same, a pipe extending through the bottom of the ash pan, an ash plow in the bottom of the pan to expel the ashes, an agitator located above the plow and adapted to shake the fuel bed through the medium of the ashes, and means for operating said plow and agitator, such means comprising a rotating member to which both the plow and agitator are connected to operate them in unison.

8. A gas producer having a nozzle in the bottom of the body thereof, a chambered cap or hood covering the same and means for circulating a cooling medium through the chamber of the hood or cap.

9. A gas producer having a nozzle in the bottom thereof, a cap or hood covering the same and constituting an agitator, and means for imparting motion to said hood, whereby it serves as an agitator as well as a cover for the nozzle.

10. A gas producer having a body, a pipe or nozzle in the bottom thereof, a chambered hood covering the open end of the pipe and provided with agitating surfaces and a hollow watercooled shaft mounting and operating said hood and communicating with the chamber thereof to furnish a cooling medium, and a hollow downward extension from and communicating with the chamber of said hood, the extension passing into the nozzle and forming a mud cup.

11. A gas producer having a body, a pipe or nozzle in the bottom thereof, a chambered hood covering the open end of the pipe and provided with agitating surfaces and a hollow watercooled shaft mounting and operating said hood and communicating with the chamber thereof to furnish a cooling medium.

12. A gas producer having a body, a pipe or nozzle in the bottom thereof, a chambered hood covering the open end of the pipe and provided with agitating surfaces, a hollow watercooled shaft mounting and operating said hood, said hollow shaft having a downward extension projecting through the pipe and means for holding said extension against lateral motion.

13. A gas producer having a body, an ash pan below the same, a pipe or nozzle in the bottom of the ash pan, a rotary sleeve surrounding the pipe, gearing for rotating the sleeve, means for protecting said gearing from the ashes in the pan and a plow attached to the sleeve.

14. A gas producer having a body, an ash pan below the same, a pipe or nozzle in the bottom of the ash pan, a rotary sleeve surrounding the pipe, gearing for rotating the sleeve, means for protecting said gearing from the ashes in the pan, a plow attached to the sleeve, and an agitator attached to the sleeve above the plow, the agitator operating in the ash stratum.

15. A gas producer having a body, an ash pan below the same a pipe or nozzle in the bottom of the ash pan, a rotary sleeve surrounding the pipe, gearing for rotating the sleeve, means for protecting said gearing from the ashes in the pan, a plow attached to the sleeve, an agitator attached to the sleeve above the plow, the agitator operating in the ash stratum, a hood mounted over the end of the pipe and having an agitating surface and means for mounting and rotating said hood.

16. A gas producer having a body, an ash pan below the same, a pipe or nozzle in the bottom of the ash pan, a rotary sleeve surrounding the pipe, gearing for rotating the sleeve, means for protecting said gearing from the ashes in the pan, a plow attached to the sleeve, an agitator attached to the sleeve above the plow, the agitator operating in the ash stratum, a hood mounted over the end of the pipe and having an agitating surface, and means for mounting and rotating said hood, comprising a watercooled shaft or pipe extending through the producer and having an extension projecting into and guided by a part of the pipe.

17. A down draft gas producer having a charging means at its top air supply opening adjacent the charging means, a centrally located gas outlet flue passing through the bottom of the producer and a mobile agitator covering the outlet flue.

18. A down draft gas producer having an inlet for fuel adjacent the upper end thereof and an inlet for air also adjacent the upper end thereof, a centrally located gas outlet flue passing through the bottom of the producer and a mobile agitator covering the outlet flue.

19. A down draft gas producer having an air supply opening and a gas outlet opening, one of said openings being located adjacent the top of the producer and the other openings being located adjacent the bottom of the producer and a mobile agitator covering the said last-mentioned opening and means for cooling said agitator.

In testimony whereof I have signed my name to this specification in the presence of two subscribing witnesses.

WILLIAM B. CHAPMAN.

Witnesses:
ISAAC B. OWENS,
JNO. M. RITTER.